United States Patent
Chen et al.

(10) Patent No.: US 11,941,777 B2
(45) Date of Patent: Mar. 26, 2024

(54) PICTURE ENLARGEMENT METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventors: Guanghui Chen, Beijing (CN); Jingyu Ji, Beijing (CN); Li Zou, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/819,485

(22) Filed: Aug. 12, 2022

(65) Prior Publication Data

US 2022/0383451 A1 Dec. 1, 2022

Related U.S. Application Data

(63) Continuation of application No. PCT/CN2021/114944, filed on Aug. 27, 2021.

(30) Foreign Application Priority Data

Aug. 31, 2020 (CN) .......................... 202010899327.2

(51) Int. Cl.
*G06T 7/00* (2017.01)
*G06T 3/40* (2006.01)
(Continued)

(52) U.S. Cl.
CPC .................. *G06T 3/40* (2013.01); *G06T 7/62* (2017.01); *G06V 10/225* (2022.01); *G06V 10/25* (2022.01); *G06T 2207/20221* (2013.01)

(58) Field of Classification Search
CPC ... G06T 2207/20221; G06T 3/40; G06T 7/62; G06V 10/25; G06V 10/40; G06V 10/225
See application file for complete search history.

(56) References Cited

U.S. PATENT DOCUMENTS

2004/0250216 A1* 12/2004 Roman ................. G06F 3/0481
715/800
2010/0162163 A1* 6/2010 Wang .................. G06F 3/04845
345/173
(Continued)

FOREIGN PATENT DOCUMENTS

CN 108268200 A 7/2018
CN 109034173 A 12/2018
(Continued)

OTHER PUBLICATIONS

Search Report dated Nov. 3, 2021 for PCT Application No. PCT/CN2021/114944.
(Continued)

*Primary Examiner* — Li Liu

(57) ABSTRACT

A picture processing method and apparatus, a device, and a storage medium are provided. The method includes: detecting, in response to an image editing trigger operation, a target processing part in a to-be-processed picture; determining an image region comprising the target processing part, in the to-be-processed picture; and zooming in on the image region, on an image editing interface. Hence, according to the embodiments, when an image editing operation is triggered, the target processing part on the to-be-processed picture can be quickly positioned, and be zoomed in on the image editing interface, so that a user can conveniently perform image editing on the target processing part, and the picture processing efficiency is improved to a certain extent.

17 Claims, 3 Drawing Sheets

(51) Int. Cl.
      *G06T 7/62*           (2017.01)
      *G06V 10/22*       (2022.01)
      *G06V 10/25*       (2022.01)

(56) References Cited

U.S. PATENT DOCUMENTS

| | | | | |
|---|---|---|---|---|
| 2016/0026375 A1* | 1/2016 | Wu | ................ | G06F 3/0446 |
| | | | | 715/765 |
| 2019/0392597 A1* | 12/2019 | Feng | ................ | H04N 23/687 |
| 2021/0344838 A1* | 11/2021 | Takamizawa | ...... | H04N 5/23293 |

FOREIGN PATENT DOCUMENTS

| | | |
|---|---|---|
| CN | 109859211 A | 6/2019 |
| CN | 112035038 A | 12/2020 |
| JP | 2011211621 A | 10/2011 |
| KR | 101587137 B1 | 1/2016 |

OTHER PUBLICATIONS

Extended European Search Report dated Aug. 11, 2023 for European Application No. 21860511.1 (9 pages).

* cited by examiner

PICTURE ENLARGEMENT METHOD AND APPARATUS, DEVICE, AND STORAGE MEDIUM

CROSS-REFERENCE TO RELATED APPLICATIONS

The present disclosure is a continuation of International Application No. PCT/CN2021/114944, filed on Aug. 27, 2021 which claims priority to Chinese Patent Application No. 202010899327.2, titled "PICTURE PROCESSING METHOD AND APPARATUS, DEVICE, AND STORAGE MEDIUM", filed with the China National Intellectual Property Administration on Aug. 31, 2020, both of which are incorporated herein by reference in their entireties.

FIELD

The present disclosure relates to the field of picture data processing, and in particular, to a picture processing method and apparatus, a device, and a storage medium.

BACKGROUND

At present, with the increasing variety of picture effect processing software, users have increasing high demands for picture effect processing.

However, due to the mobile terminal with a small screen, it is inconvenient to perform effect processing on the picture, which affects the picture processing efficiency to a certain extent.

SUMMARY

In order to solve all or at least part of the above technical problems, an image processing method and apparatus, a device, and a storage medium are provided according to the present disclosure, to improve the picture processing efficiency.

In a first aspect, a picture processing method is provided according to the present disclosure. The method includes:
detecting a target processing part in a to-be-processed picture, in response to an image editing trigger operation;
determining an image region including the target processing part, in the to-be-processed picture; and
zooming in on the image region, on an image editing interface.

In an embodiment, after determining an image region including the target processing part, in the to-be-processed picture, the method further includes:
displaying an enlargement control for the image region; and
the zooming in on the image region, on an image editing interface includes:
zooming in on the image region on the image editing interface, in response to a trigger operation for the enlargement control.

In an embodiment, the to-be-processed picture includes at least two image regions; and the displaying an enlargement control for the image region includes:
displaying enlargement controls which respectively correspond to the at least two image regions.

The zooming in on the image region on the image editing interface, in response to a trigger operation for the enlargement control includes:
in response to a trigger operation for a target enlargement control, zooming in on a target image region corresponding to the target enlargement control on the image editing interface; where the target image region is an arbitrary image region of the at least two image regions.

In an embodiment, the enlargement control is provided with a thumbnail corresponding to the image region, and the thumbnail is a thumbnail of the target processing part included in the image region.

In an embodiment, before the zooming in on the image region, on the image editing interface, the method further includes:
determining an enlargement factor corresponding to the image region based on an area proportion between the image region and the image editing interface.

The zooming in on the image region, on an image editing interface includes:
zooming in on the image region on the image editing interface, based on the enlargement factor.

In an embodiment, the determining an enlargement factor corresponding to the image region based on an area proportion between the image region and the image editing interface includes:
in a case that the area proportion between the image region and the image editing interface is greater than a preset proportional coefficient, determining a standard enlargement factor as the enlargement factor corresponding to the image region;
in a case that the area proportion between the image region and the image editing interface is smaller than or equal to the preset proportional coefficient, determining the enlargement factor corresponding to the image region based on the area proportion; where the area proportion is inversely proportional to the enlargement factor.

In an embodiment, after the zooming in on the image region on an image editing interface, the method further includes:
displaying an edited image of the image region on the image editing interface, in response to an image editing operation for the image region; and
compositing the edited image into the to-be-processed picture and display the composited picture, in response to a display trigger operation for the to-be-processed picture.

In an embodiment, before the detecting, in response to an image editing trigger operation, a target processing part in a to-be-processed picture, the method further includes:
in response to an operation of selecting at least one processing part among multiple processing parts, determining the at least one processing part as the target processing part of the to-be-processed picture.

In a second aspect, a picture processing apparatus is provided according to the present disclosure. The device includes: a first detection module, a first determination module and an enlargement display module.

The first detection module is configured to detect, a target processing part in a to-be-processed picture, in response to an image editing trigger operation.

The first determination module is configured to determine an image region including the target processing part, in the to-be-processed picture.

The enlargement display module is configured to zoom in on the image region, on an image editing interface.

In a third aspect, a computer readable storage medium is provided according to the present disclosure. The computer readable storage medium stores instructions. The instructions, when being executed on a terminal device, cause a terminal device to implement the above method.

In a fourth aspect, a device is provided according to the present disclosure. The device includes: a memory, a processor, and computer programs stored in the memory and executed on the processor. The computer programs, when executed by the processor, cause the processor to implement the above method.

Compared with the conventional technology, the technical solutions provided by embodiments of the present disclosure have the following advantages.

A picture processing method is provided according to the embodiment of the present disclosure. When the image editing trigger operation is received, the target processing part is detected in the to-be-processed picture. Then, the image region including the target processing part is determined on the to-be-processed picture. Finally, the image region is zoomed in on the image editing interface. According to the embodiments of the present disclosure, when an image editing operation is triggered, the target processing part of the to-be-processed picture can be quickly positioned, and be zoomed in on the image editing interface, which is convenient for the user to perform image editing processing on the target processing part, thereby improving the picture processing efficiency to a certain extent.

BRIEF DESCRIPTION OF THE DRAWINGS

The drawings herein are incorporated into the specification and constitute a part of the specification, which show embodiments of the present disclosure. The drawings and the specification are used to explain the principle of the present disclosure.

In order to more clearly illustrate the embodiments of the present disclosure or the technical solutions in the conventional art, the drawings used in the description of the embodiments or the conventional art are briefly introduced below. It is apparent that, for those skilled in the art, other drawings can be obtained according to the provided drawings without any creative effort.

DETAILED DESCRIPTION OF EMBODIMENTS

In order to understand the above purposes, features, and advantage of the present disclosure more clearly, the technical solutions according to the present disclosure will be further described. It should be noted that the embodiments of the present disclosure and the features in the embodiments may be combined with each other if there is no conflict.

In the following description, numerous specific details are set forth in order to provide thorough understanding of the present disclosure. However, the present disclosure may also be implemented in other ways different from those described here. Obviously, the embodiments in the specification are only a part of the embodiments of the present disclosure, rather than all the embodiments.

When the user performs effect processing on a picture, a certain detail part on the picture may usually be adjusted, by manually zooming in on the picture, determining the enlarged detail part, and then performing the effect processing on the enlarged detail part.

For example, when a user edit a face part in a picture by a smart phone, the picture needs to be enlarged manually, and then the face part is determined by dragging the picture more than once. In this way, the face part can be edited.

Obviously, the operation of the above picture processing is too complicated, which has a low efficiency of positioning and enlarging the detail parts to be processed in the picture, thereby reducing the picture processing efficiency to a certain extent.

In view of this, a picture processing method is provided according to an embodiment of the present disclosure. When an image editing trigger operation is received, a target processing part is detected on a to-be-processed picture. Then, the image region including a target processing part is determined on the to-be-processed picture. Finally, the image region is zoomed in on the image editing interface. According to the embodiments of the present disclosure, when an image editing operation is triggered, the target processing part of the to-be-processed image can be quickly positioned, and be zoomed in on the image editing interface, which is convenient for the user to perform image editing processing on the target processing part, thereby improving the picture processing efficiency to a certain extent.

Figure 1:
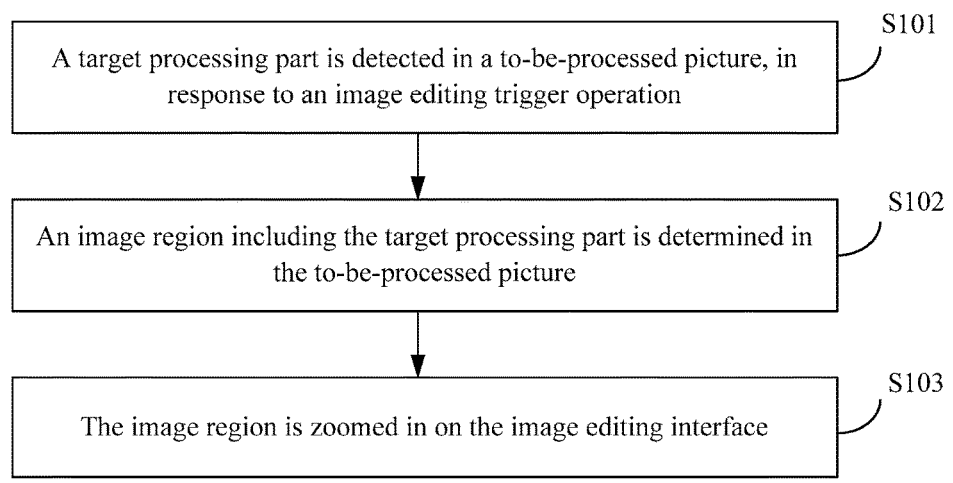
FIG. 1 illustrates a flowchart of a picture processing method according to an embodiment of the present disclosure.

Based on this, a picture processing method is provided according to an embodiment of the present disclosure. Referring to FIG. 1, which illustrates a flowchart of a picture processing method according to an embodiment of the present disclosure. The method includes steps S101 to S103.

In S101, a target processing part is detected in a to-be-processed picture, in response to an image editing trigger operation.

In an embodiment of the present disclosure, the to-be-processed picture may be a picture having a detail part to be processed. For example, the to-be-processed picture may be a picture including a person to be edited, such as a single-person selfie and a photo with multiple persons. For another example, the to-be-processed picture may be a picture having a specific object to be edited in detail, such as an advertisement picture of a certain object.

In practical application, there may be requirements for processing different detailed parts for different pictures. For example, there may be requirements for editing a face part, a leg part or an eye part for a people picture. There may be requirements for processing other specific detail parts in a picture of specific object, for example, an advertisement picture for a specific object. It is necessary to edit the specific object on the advertisement picture.

Therefore, in an embodiment, before the to-be-processed picture is processed, a target processing part corresponding to the to-be-processed picture may be determined based on the picture processing requirements, such that the subsequent picture processing may be performed on the target processing part of the to-be-processed image.

In an embodiment, multiple selectable processing parts may be provided to the user. The user may select at least one processing part for the to-be-processed picture from the selectable processing parts based on the picture processing requirements, as a target processing part corresponding to the to-be-processed picture. For example, for a picture with people, three selectable processing parts such as a face part, a leg part and an eye part may be provided to the user. The user selects at least one processing part for the to-beprocessed picture, and then the selected processing part is determined as the a target processing part corresponding to the to-be-processed picture.

It should be noted that, in an embodiment of the present disclosure, the target processing part corresponding to the to-be-processed picture may be one or multiple. For example, for a picture with people, the target processing part corresponding to the picture may include both the face part and the leg part.

In an embodiment of the present disclosure, when an image editing trigger operation is received, the target processing part may be detected on the to-be-processed picture. For example, when an image editing trigger operation is received, a face part is detected on the to-be-processed picture.

In an embodiment, after the target processing part corresponding to the to-be-processed picture is determined, the target processing part is detected in the to-be-processed picture, in response to a reception of if an image editing trigger operation. For example, after the target processing part corresponding to the to-be-processed picture is determined, the detection to the target processing part in the to-be-processed picture may be triggered by clicking an image editing button.

In another embodiment, an image editing operation for the to-be-processed picture may be triggered by determining the target processing part corresponding to the to-be-processed picture. For example, when the target processing part corresponding to the to-be-processed picture is selected and a confirmation button is triggered, the image editing operation for the to-be-processed picture may also be triggered.

In the embodiment of the present disclosure, the detection to the target processing part in the to-be-processed picture may be implemented based on a machine learning model. For example, a machine learning model for a human face image is trained in advance. The face part is detected in the to-be-processed picture based on the machine learning model. The detection to other target processing parts may also be implemented in a similar manner, which will not be described in detail in the embodiments of the present disclosure.

In S102, an image region including the target processing part is determined in the to-be-processed picture.

In an embodiment of the present disclosure, after the target processing part is detected in the to-be-processed picture, the position of the target processing part in the to-be-processed picture may be determined. The image region that includes the target processing part is further determined in the to-be-processed picture. The image region may be a smallest rectangular region including the target processing part.

In practical application, the to-be-processed picture may include multiple target processing parts. Thus, after each of the target processing parts is detected on the to-be-processed picture, image regions including respective detected target processing parts are determined.

In an embodiment, when the image region including the target processing part is determined to be included in the to-be-processed picture, the image region may be displayed distinctively in the to-be-processed picture, such that the user may intuitively understand the parts to be processed in the to-be-processed picture. In an embodiment, the boundary of the image region may be displayed in dotted lines, so as to distinctively display the image region.

In S103, the image region is zoomed in on the image editing interface.

In an embodiment of the present disclosure, when the image region including the target processing part is determined to be included in the to-be-processed picture, the image region may be zoomed in on the image editing interface, such that the user may performing image editing processing on the enlarged image region.

In an embodiment, the image region may be zoomed in by double-clicking the image region on the to-be-processed picture.

In another embodiment, if the image region is provided with a corresponding enlargement control, the image region may be zoomed in in response to a trigger operation for the enlargement control. Specifically, the image region corresponding to the enlargement control may be zoomed in by clicking on the enlargement control.

In addition, before the image region is zoomed in, an enlargement factor for zooming in on the image region may also be determined. Specifically, the enlargement factor corresponding to the image region may be determined based on an area proportion between the image region and the image editing interface. Then, on the image editing interface, the image region is zoomed in based on the enlargement factor.

In an embodiment, before the image region is zoomed in, the area proportion between the image region and the image editing interface is determined. The area proportion greater than a preset proportional coefficient indicates that the image region occupies a greater proportion of the display screen. In this case, a standard enlargement factor may be determined as the enlargement factor corresponding to the image region, to zoom in on the image region based on the preset enlargement factor.

It can be understood that, image regions with area proportions greater than the preset proportional coefficient are zoomed in based on the same preset enlargement factor. In this way, the target processing part in the image region can be displayed clearly, and the enlarged target processing part can meet the image processing requirements of the user.

For an image region with an area proportion less than or equal to the preset proportional coefficient, if the image region is zoomed in based on a uniform preset enlargement factor, the enlarged target processing part in the image region may still not be displayed clearly. That is, even if the image region is zoomed in based on the preset enlargement factor, the target processing part in the enlarged image region may not be displayed clearly, which cannot meet the processing requirement of the user for the image region.

Therefore, in an embodiment of the present disclosure, when it is determined that the area proportion between the image region and the image editing interface is smaller than or equal to the preset proportional coefficient, the enlargement factor corresponding to the image region may be determined based on the area proportion. The smaller the area proportion is, the greater the enlargement factor is, so as to ensure that the target processing part in the enlarged image region can meet the processing requirements of the user for the image region.

In actual application scenarios, in a process of the picture processing, the picture is continually enlarged and reset. In this way, after the image editing processing is performed on the image region each time, an overall effect of the edited picture in the original picture may be viewed by compositing the edited picture into the to-be-processed picture.

In view of this, in an embodiment of the present disclosure, when an image editing operation for the enlarged image region is received, the edited image of the image region is displayed on the image editing interface. Then, when a display trigger operation for the to-be-processed picture is received, the edited image is composited into the to-be-processed picture, and the composited picture is displayed.

In an embodiment, a display control may be provided on the display interface. After the image editing processing is performed on the target processing part in the image region, the user triggers the display operation for the to-be-processed picture by clicking the display control. The edited image is composited into the to-be-processed picture, and the composited to-be-processed picture is displayed, such that the user can view the overall effect of the to-be-processed picture after the image editing processing is performed on the target processing part. In addition, with a function of one-key reset, the overall picture processing efficiency can be improved.

In the picture processing method according to the embodiments of the present disclosure, when the image editing trigger operation is received, the target processing part is detected in the to-be-processed picture. Then, the image region including the target processing part is determined on the to-be-processed picture. Finally, the image region is zoomed in on the image editing interface. According to the embodiments of the present disclosure, when an image editing operation is triggered, the target processing part on the to-be-processed picture can be quickly positioned, and be zoomed in on the image editing interface, which is convenient for the user to perform image editing processing on the target processing part, thereby improving the picture processing efficiency to a certain extent.

Figure 2:
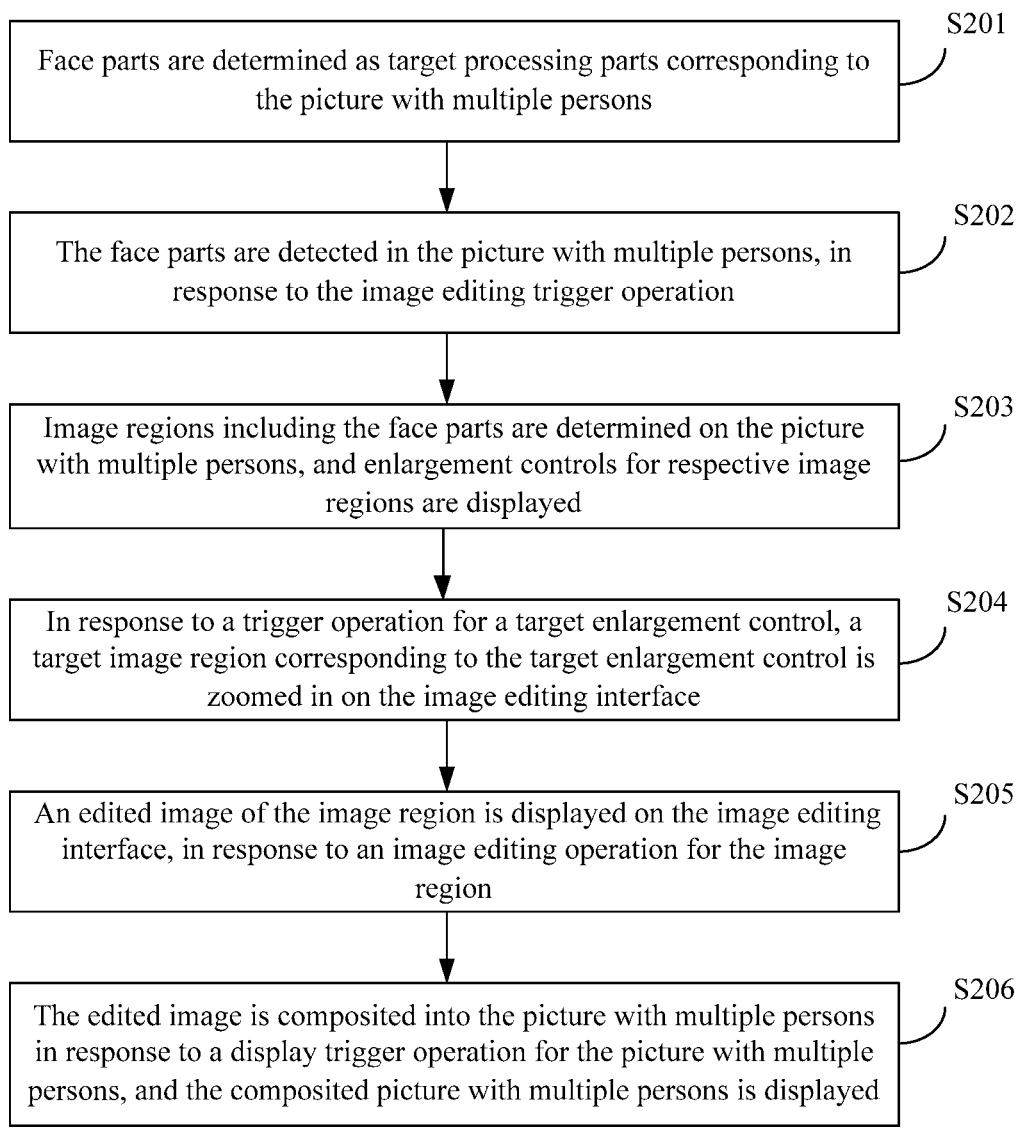
FIG. 2 illustrates a flowchart of a picture processing method for a photo with multiple persons according to an embodiment of the present disclosure.

For ease of understanding the technical solution, an embodiment of an application scenario is also provided according to the present disclosure. Referring to FIG. 2, which illustrates a flowchart of a picture processing method for a photo with multiple persons according to an embodiment of the present disclosure. The method includes steps S201 to S206.

In S201, face parts are determined as target processing parts corresponding to the picture with multiple persons.

In an embodiment of the present disclosure, for the picture with multiple persons, the face parts are determined as the target processing parts corresponding to the picture of multiple persons, such that the user can edit the faces in the picture with multiple persons.

It should be noted that, in an embodiment of the present disclosure, the face part is taken as an example of the target processing part, and the implementation of other parts as the target processing part can be understood by reference, which will not be repeated here. The target processing part for the picture with multiple persons may be one or multiple. Specifically, when an operation of the user selecting at least one variety of processing part among multiple varieties of processing parts is received, the at least one variety of processing part may be determined as the target processing part of the picture with multiple persons. For example, the at least one variety of processing part includes a face part and a leg part.

In S202, the face parts are detected in the picture with multiple persons, in response to the image editing trigger operation.

In an embodiment of the present disclosure, when the image editing trigger operation is received, each of the face parts in the picture with multiple persons may be detected. Specifically, face parts may be detected by using a face recognition model.

In an embodiment, a detection operation for the face parts may be triggered with a determination of the target processing parts corresponding to the picture with multiple persons, so as to detect the faces on the picture with multiple persons.

In S203, image regions including the face parts are determined on the picture with multiple persons, and enlargement controls for respective image regions are displayed.

In an embodiment of the present disclosure, each of face parts in the picture with multiple persons is detected. Thus, a position of each face in the picture with multiple persons may be determined, and an image region for each face is determined. Specifically, it is assumed that the to-be-processed picture includes three faces. The image regions including the above three faces are respectively determined in the to-be-processed picture. That is, three image regions are determined, and each of the three image regions includes one of the above three faces.

In an embodiment of the present disclosure, after the image region including the face part is determined on the picture with multiple persons, in order to facilitate triggering the enlarged display of the image region, an enlargement control may be provided for the image region according to an embodiment of the present disclosure. The enlargement control is used to trigger the enlarged display of the image region.

In an embodiment, if it is determined that the picture with multiple persons includes multiple image regions including the target processing parts, the corresponding enlargement controls may be provided for the respective image regions. Each of the enlargement controls is configured to trigger the enlarged display of the image region corresponding to the enlargement control, to zoom in on the image region. That is, the target processing part included in the image region is zoomed in.

In addition, in order to facilitate a determination of image regions corresponding to respective enlargement controls, thumbnails may be provided for the respective enlargement controls. Specifically, a thumbnail of the target processing part included in the image region corresponding to one enlargement control may be used as the thumbnail for the enlargement control.

In an embodiment, a pattern displayed on the enlargement control is a thumbnail of the target processing part included in the image region corresponding to the enlargement control. Based on the displayed thumbnail, it is possible to more accurately zoom in on the image region to be processed on the picture with multiple persons.

In another embodiment, if it is determined that the picture with multiple persons includes multiple image regions including the target processing parts, an enlargement control may be provided for each of the image regions. Specifically, after any image region on the picture with multiple persons is selected, the enlarged display for the selected image region may be triggered by clicking the enlargement control thereof.

The image region corresponding to each of faces may be a smallest rectangular area including the face.

In S204, in response to a trigger operation for a target enlargement control, a target image region corresponding to the target enlargement control is zoomed in on the image editing interface. The target image region is any one of the at least two image regions. In an embodiment of the present disclosure, an enlargement control is provided for each of the faces in the picture with multiple persons. The user may click the target enlargement control based on the picture processing requirements, so as to zoom in on the image region corresponding to the target enlargement control on the image editing interface.

In S205, an edited image of the image region is displayed on the image editing interface, in response to an image editing operation for the image region.

In an embodiment of the present disclosure, after the image region is zoomed in on the image editing interface, the user may perform an image editing operation on the image region, such as editing the detail of the face part, adjusting an overall color, and the like. Then, the edited image corresponding to the image region is displayed on the image editing interface.

In S206, the edited image is composited into the picture with multiple persons in response to a display trigger operation for the picture with multiple persons, and the composited picture with multiple persons is displayed.

In practical application, after the face in the enlarged image region is edited, the user needs to view the overall display effect of the edited face in the picture with multiple persons.

Therefore, according to an embodiment of the present disclosure, the edited image is composited into the original picture by triggering the display operation for the picture with multiple persons, such as by clicking a reset button and the like. In this way, the reset of the picture with multiple persons is realized by the one-key trigger, thereby improving the efficiency of image processing.

The operation of editing the image is a cycle operation performed by zooming in on and editing the image region in the picture with multiple persons, and compositing the edited image region into the original image to view the overall effect. Thus, according to the present disclosure, the image region is zoomed in by one-key trigger, and the edited image region is composited into the original image by one-key trigger to view the overall effect, facilitating the user implementing the effect processing of the picture with multiple persons.

In the picture processing method for the photo with multiple persons according to the embodiment of the present disclosure, face recognition is performed on the picture with multiple persons, such that the image regions corresponding to respective faces on the picture with multiple persons can be determined, thereby positioning the face quickly. In addition, it is possible to trigger the enlarged display of the image region by one-key such as a button, and reset the picture o with multiple persons by one-key. The operation is simple, and the image processing efficiency is improved to a certain extent.

Figure 3:
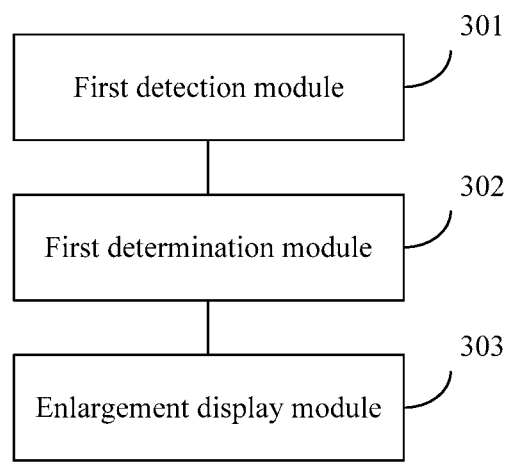
FIG. 3 illustrates a structural block diagram of a picture processing apparatus according to an embodiment of the present disclosure.

Based on the same inventive concept as the above method embodiments, a picture processing apparatus is also provided according to the present disclosure. FIG. 3 illustrates a picture processing apparatus according to an embodiment of the present disclosure. The picture processing apparatus includes: a first detection module 301, a first determination module 302 and an enlargement display module 303.

The first detection module 301 is configured to detect, in response to an image editing trigger operation, a target processing part in a to-be-processed picture.

The first determination module 302 is configured to determine an image region including the target processing part, in the to-be-processed picture.

The enlargement display module 303 is configured to zoom in on the image region, on an image editing interface.

In an embodiment, the picture processing apparatus includes: a first display module configured to display an enlargement control for the image region.

The enlargement display module is specifically configured to: zoom in on the image region on the image editing interface, in response to a trigger operation for the enlargement control.

In an embodiment, the to-be-processed picture includes at least two image regions.

The first display module is specifically configured to display enlargement controls which respectively correspond to the at least two image regions.

The enlargement display module 303 is specifically configured to: in response to a trigger operation for a target enlargement control, zoom in on a target image region corresponding to the target enlargement control on the image editing interface; where the target image region is an arbitrary image region of the at least two image regions.

In an embodiment, the enlargement control is provided with a thumbnail corresponding to the image region, and the thumbnail is a thumbnail of the target processing part included in the image region.

In an embodiment, the picture processing apparatus further includes: a third determination module configured to determine an enlargement factor corresponding to the image region based on an area proportion between the image region and the image editing interface.

The enlargement display module is specifically configured to: zoom in on the image region on the image editing interface, based on the enlargement factor.

In an embodiment, the third determination module further includes: a first determination sub-module and a second determination sub-module.

The first determination sub-module is configured to in a case that the area proportion between the image region and the image editing interface is greater than a preset proportional coefficient, determine a preset enlargement factor as the enlargement factor corresponding to the image region.

The second determination sub-module is configured to in a case that the area proportion between the image region and the image editing interface is smaller than or equal to the preset proportional coefficient, determine the enlargement factor corresponding to the image region based on the area proportion; where the area proportion is inversely proportional to the enlargement factor.

In an embodiment, the picture processing apparatus further includes: a second display module and a third display module.

The second display module is configured to display an edited image of the image region on the image editing interface, in response to an image editing operation for the image region.

The third display module is configured to composite the edited image into the to-be-processed picture and display the composited picture, in response to a display trigger operation for the to-be-processed picture.

In an embodiment, the picture processing apparatus further includes: a fourth determination module configured to in response to an operation of selecting at least one processing part among the plurality of processing parts, determine the at least one processing part as a target processing part of the to-be-processed picture.

In the picture processing apparatus according to the embodiments of the present disclosure, when the image editing trigger operation is received, the target processing part is detected in the to-be-processed picture. Then, the image region including the target processing part is determined on the to-be-processed picture. Finally, the image region is zoomed in on the image editing interface. According to the embodiments of the present disclosure, when an image editing operation is triggered, the target processing part on the to-be-processed picture can be quickly positioned, and be zoomed in on the image editing interface, which is convenient for the user to perform image editing processing on the target processing part, thereby improving the picture processing efficiency to a certain extent.

Figure 4:
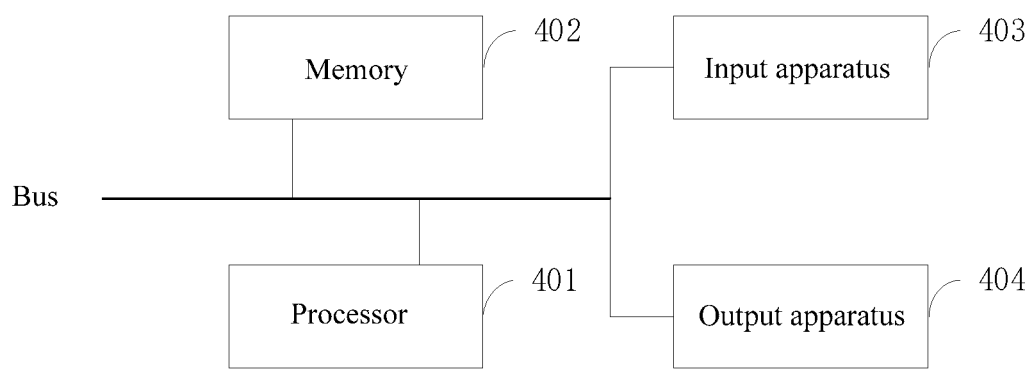
FIG. 4 illustrates a structural block diagram of a picture processing device according to an embodiment of the present disclosure.

In addition, a picture processing device is further provided according to an embodiment of the present disclosure. Referring to FIG. 4, the picture processing device may include: a processor 401, a memory 402, an input apparatus 403 and an output apparatus 404. The picture processing device may include one or more processors 401. One processor is taken as an example in FIG. 4. In some embodiments of the present disclosure, the processor 401, the memory 402, the input apparatus 403 and the output apparatus 404 may be connected through a bus or in other manner. In FIG. 4, a connection through the bus is taken as an example.

The memory 402 may be configured to store a software program and module. The processor 401 runs the software program and module stored in the memory 402, to perform various functional applications and data processing of the picture processing device. The memory 402 may mainly include a program memory area and a data memory area. An operating system, an application required by at least one function and the like are stored in the program memory area. In addition, the memory 402 may include a high-speed random access memory, and may further include a non-volatile memory, such as at least one disk storage device, a flash device or other volatile solid-state storage device. The input apparatus 403 may be configured to receive inputted number or character information, and generate a signal related to user settings and function control of the picture processing device.

In the embodiment, the processor 401 may load an executable file corresponding to the processes of one or more application programs into the memory 402 in response to an instruction, and the processor 401 runs the application programs stored in the memory 402, thereby realizing various functions in the above picture processing device.

It should be noted that the relationship terms "first", "second" and the like herein are used for distinguishing an entity or operation from another entity or operation, but not intended to necessitate or imply an actual relationship or order between these entities or operations. Further, the terms "include", "comprise" or any variant thereof are intended to encompass nonexclusive inclusion such that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the scope of the present disclosure. Therefore, the present disclosure is not limited to the embodiments illustrated herein, but should be defined by the broadest scope consistent with the principle and novel features disclosed herein.

The invention claimed is:

1. A picture processing method, comprising:
   determining at least one processing part from a plurality of selectable processing parts in a to-be-processed picture, as a target processing part;
   detecting the determined target processing part in the to-be-processed picture, in response to an image editing trigger operation;
   determining an image region comprising the determined target processing part, in the to-be-processed picture;
   providing an enlargement control corresponding to the determined image region after the image region is determined, wherein the enlargement control is configured to trigger an enlarged display of the determined target processing part in the image region corresponding to the enlargement control;
   displaying the enlargement control corresponding to the determined image region; and
   zooming in on the image region, on an image editing interface, in response to a trigger operation for the enlargement control.

2. The picture processing method according to claim 1, wherein the to-be-processed picture comprises at least two image regions; and the displaying the enlargement control corresponding to the determined image region comprises:
   displaying enlargement controls which respectively correspond to the at least two image regions; and
   wherein the zooming in on the image region on the image editing interface, in response to a trigger operation for the enlargement control comprises:
      in response to a trigger operation for a target enlargement control, zooming in on a target image region corresponding to the target enlargement control on the image editing interface; wherein the target image region is an arbitrary image region of the at least two image regions.

3. The picture processing method according to claim 1, wherein the enlargement control is provided with a thumbnail corresponding to the determined image region, and the thumbnail is a thumbnail of the target processing part comprised in the determined image region.

4. The picture processing method according to claim 1, wherein before the zooming in on the image region, on the image editing interface, the method further comprises:
   determining an enlargement factor corresponding to the image region based on an area proportion between the image region and the image editing interface; and
   wherein the zooming in on the image region, on an image editing interface comprises:
      zooming in on the image region on the image editing interface, based on the enlargement factor.

5. The picture processing method according to claim 4, wherein the determining an enlargement factor corresponding to the image region based on an area proportion between the image region and the image editing interface comprises:
   in a case that the area proportion between the image region and the image editing interface is greater than a preset proportional coefficient, determining a standard enlargement factor as the enlargement factor corresponding to the image region; and
   in a case that the area proportion between the image region and the image editing interface is smaller than or equal to the preset proportional coefficient, determining the enlargement factor corresponding to the image region based on the area proportion; wherein the area proportion is inversely proportional to the enlargement factor.

6. The picture processing method according to claim 1, wherein after the zooming in on the image region, on an image editing interface, the method further comprises:
    displaying an edited image of the image region on the image editing interface, in response to an image editing operation for the image region; and
    compositing the edited image into the to-be-processed picture and displaying the composited picture, in response to a display trigger operation for the to-be-processed picture.

7. The picture processing method according to claim 1, wherein before the detecting, in response to an image editing trigger operation, a target processing part in a to-be-processed picture, the method further comprises:
    in response to an operation of selecting at least one processing part among a plurality of processing parts, determining the at least one processing part as the target processing part of the to-be-processed picture.

8. A picture processing apparatus, comprising:
    a memory;
    a processor; and
    computer programs stored in the memory and executed on the processor,
    wherein the computer programs, when executed by the processor, cause the processor to
    determine at least one processing part from a plurality of selectable processing parts in a to-be-processed picture, as a target processing part;
    detect the determined target processing part in the to-be-processed picture, in response to an image editing trigger operation;
    determine an image region comprising the determined target processing part, in the to-be-processed picture;
    provide an enlargement control corresponding to the determined image region after the image region is determined, wherein the enlargement control is configured to trigger an enlarged display of the determined target processing part in the determined image region corresponding to the enlargement control;
    display the enlargement control corresponding to the determined image region; and
    zoom in on the image region, on an image editing interface, in response to a trigger operation for the enlargement control.

9. The picture processing apparatus according to claim 8, wherein the to-be-processed picture comprises at least two image regions; and the computer programs, when executed by the processor, cause the processor to:
    display enlargement controls which respectively correspond to the at least two image regions; and
    in response to a trigger operation for a target enlargement control, zoom in on a target image region corresponding to the target enlargement control on the image editing interface;
    wherein the target image region is an arbitrary image region of the at least two image regions.

10. The picture processing apparatus according to claim 8, wherein the enlargement control is provided with a thumbnail corresponding to the determined image region, and the thumbnail is a thumbnail of the target processing part comprised in the determined image region.

11. The picture processing apparatus according to claim 8, wherein the computer programs, when executed by the processor, cause the processor to:
    determine an enlargement factor corresponding to the image region based on an area proportion between the image region and the image editing interface; and
    zoom in on the image region on the image editing interface, based on the enlargement factor.

12. The picture processing apparatus according to claim 11, wherein the computer programs, when executed by the processor, cause the processor to:
    in a case that the area proportion between the image region and the image editing interface is greater than a preset proportional coefficient, determine a standard enlargement factor as the enlargement factor corresponding to the image region; and
    in a case that the area proportion between the image region and the image editing interface is smaller than or equal to the preset proportional coefficient, determine the enlargement factor corresponding to the image region based on the area proportion; wherein the area proportion is inversely proportional to the enlargement factor.

13. The picture processing apparatus according to claim 8, wherein the computer programs, when executed by the processor, cause the processor to:
    display an edited image of the image region on the image editing interface, in response to an image editing operation for the image region; and
    composite the edited image into the to-be-processed picture and display the composited picture, in response to a display trigger operation for the to-be-processed picture.

14. The picture processing apparatus according to claim 8, wherein the computer programs, when executed by the processor, cause the processor to:
    in response to an operation of selecting at least one processing part among a plurality of processing parts, determine the at least one processing part as the target processing part of the to-be-processed picture.

15. A non-transitory computer readable storage medium storing instructions, wherein the instructions when executed by a terminal device, cause the terminal device to
    determine at least one processing part from a plurality of selectable processing parts in a to-be-processed picture, as a target processing part;
    detect the determined target processing part in the to-be-processed picture, in response to an image editing trigger operation;
    determine an image region comprising the determined target processing part, in the to-be-processed picture;
    provide an enlargement control corresponding to the determined image region after the image region is determined, wherein the enlargement control is configured to trigger an enlarged display of the determined target processing part in the determined image region corresponding to the enlargement control;
    display the enlargement control corresponding to the determined image region; and
    zoom in on the image region, on an image editing interface, in response to a trigger operation for the enlargement control.

16. The non-transitory computer readable storage medium according to claim 15, wherein the to-be-processed picture comprises at least two image regions;
    and the instructions when executed by a terminal device, cause the terminal device to:
    display enlargement controls which respectively correspond to the at least two image regions; and
    in response to a trigger operation for a target enlargement control, zoom in on a target image region corresponding to the target enlargement control on the image editing interface;

wherein the target image region is an arbitrary image region of the at least two image regions.

17. The non-transitory computer readable storage medium according to claim 15, wherein the enlargement control is provided with a thumbnail corresponding to the determined image region, and the thumbnail is a thumbnail of the target processing part comprised in the determined image region.

* * * * *